US010377512B2

(12) United States Patent
Kruse

(10) Patent No.: US 10,377,512 B2
(45) Date of Patent: Aug. 13, 2019

(54) ASSEMBLY AND MOUNTING OF A REFLECTIVE FILM ON A COMPOSITE STRUCTURE

(71) Applicant: Alliance Space Systems, LLC., Los Alamitos, CA (US)

(72) Inventor: Matthew Kruse, Aliso Viejo, CA (US)

(73) Assignee: Alliance Spacesystems, LLC, Los Alamitos, CA (US)

( * ) Notice: Subject to any disclaimer, the term of this patent is extended or adjusted under 35 U.S.C. 154(b) by 26 days.

(21) Appl. No.: 15/289,347

(22) Filed: Oct. 10, 2016

(65) Prior Publication Data
US 2018/0257363 A1    Sep. 13, 2018

(51) Int. Cl.
| B32B 37/00 | (2006.01) |
| B32B 15/00 | (2006.01) |
| B64G 1/00 | (2006.01) |
| B64G 1/22 | (2006.01) |
| B32B 15/08 | (2006.01) |
| B32B 15/20 | (2006.01) |
| B32B 38/10 | (2006.01) |

(52) U.S. Cl.
CPC ............. *B64G 1/22* (2013.01); *B32B 15/08* (2013.01); *B32B 15/20* (2013.01); *B32B 37/025* (2013.01); *B32B 38/10* (2013.01); *B32B 2262/106* (2013.01); *B32B 2311/00* (2013.01); *B32B 2311/24* (2013.01); *B32B 2551/08* (2013.01)

(58) Field of Classification Search
CPC ......... B32B 37/00; B32B 37/20; B32B 37/26; B32B 15/00; B32B 15/08; B32B 15/20; B64G 1/00; B64G 1/20; B64G 1/22
See application file for complete search history.

(56) References Cited

U.S. PATENT DOCUMENTS

| 6,197,147 | B1* | 3/2001 | Bonsel | ............ C25B 9/10 |
| | | | | 156/269 |
| 7,390,528 | B2* | 6/2008 | Morii | ............ H01M 4/8605 |
| | | | | 427/115 |
| 2002/0144394 | A1* | 10/2002 | Uchida | ............ H01M 4/8828 |
| | | | | 29/623.5 |
| 2003/0026932 | A1* | 2/2003 | Johnson | ............ B32B 15/08 |
| | | | | 428/40.1 |
| 2008/0128074 | A1* | 6/2008 | Mah | ............ B32B 37/025 |
| | | | | 156/182 |
| 2009/0008142 | A1* | 1/2009 | Shimizu | ............ B32B 5/18 |
| | | | | 174/261 |
| 2018/0001272 | A1* | 1/2018 | Swaidan | ............ B01D 69/087 |

* cited by examiner

*Primary Examiner* — Michael N Orlando
*Assistant Examiner* — Matthew Hoover

(57) ABSTRACT

A method of metallizing a surface of a structure, and in some embodiments a mirror produced by such method, by the steps of providing a composite support structure; providing a release liner including a metallic layer having a thickness between 1 and 5 microns on a surface thereof; situating the release liner against the surface of the composite support structure so that the metallic layer of the release liner is placed in direct, physical contact with the surface of the support structure; and removing the release liner so that the metallic layer remains attached to the surface of the support structure.

12 Claims, 3 Drawing Sheets

ASSEMBLY AND MOUNTING OF A REFLECTIVE FILM ON A COMPOSITE STRUCTURE

BACKGROUND OF THE DISCLOSURE

1. Field of the Disclosure

The present disclosure relates to the field of composite structures, and more particularly to fabrication processes for applying a thin metallic film to the composite structure without using an evaporation or vacuum deposition technique.

2. Description of the Related Art

Composite structures are well known for use in aerospace applications. Examples of composite materials include fiber reinforced composite materials that include at least an epoxy or other polymer or binding material together with fibers, such as (but not limited to) carbon fibers, boron fibers, para-aramid (e.g., KEVLAR®. KEVLAR® is a trademark of E. I. du Pont de Nemours and Company) fibers, and/or other material fibers. In some examples, a composite structure may be fabricated from two or more layers of composite material in which a layer may include one or more plies of composite material. In some such embodiments, the plies may be pre-preg plies, which are layers, or sheets, of fibers that are pre-impregnated with the associated binding material. A complex composite structure is a structure constructed of two or more layers of composite material and with at least two layers having different configurations. For example, at least two layers may have different shapes, different thicknesses, different orientations of fibers, or other different characteristics and/or properties.

Coatings of various types may be applied to the surface of a composite structure. One of the more common methods of applying a coating is by Physical Vapor Deposition ("PVD"). PVD refers to the atomic deposition processes of vacuum evaporation; sputter deposition, and arc-vapor deposition by which material is vaporized from a solid or liquid source and transported in the form of a vapor to the substrate or structure where it condenses, forming a coating.

This species may be transported through a vacuum where the mean free path for collision between particles is in the order of the dimensions of the processing chamber or through a low-pressure environment of gas or plasma (ionized gas). In case of a reactive deposition process the depositing species reacts with gas species in the processing environment to form a compound, for example, nitrogen reacting with depositing titanium to form a coating of TiN.

There is a continuing need for improved methods of manufacturing and assembling composite structures with metallic or reflective surfaces that can result in decreases in cost and/or increases in performance of the structure.

Accordingly, the present disclosure provides improved methods of manufacturing and assembling thin metallic or reflective films on a surface of a composite material for applications that require a highly smooth surface, and can result in decreases in cost, greater uniformity in thickness, and increases in optical or electromagnetic performance.

SUMMARY OF THE DISCLOSURE

1. Objects of the Disclosure

It is an object of the present disclosure to provide a process for producing a composite structure for aerospace applications with a metallic or reflective film over the surface thereof.

It is another object of the present disclosure to provide an assembly technique for producing composite panels for aerospace applications.

It is another object of the disclosure to provide a method for making a composite panel with an extremely thin reflective surface without using an evaporative or vacuum deposition technique.

It is another object of the disclosure to provide for an assembly fixture and method that facilitates assembly of at least certain steps of the process for manufacture of composite assemblies on the fixture.

Some implementations of the present disclosure may incorporate or implement fewer of the aspects and features noted in the foregoing objects.

2. Features of the Disclosure

All ranges of numerical parameters set forth in this disclosure are to be understood to encompass any and all subranges or "intermediate generalizations" subsumed therein. For example, a stated range of "1.0 to 2.0 microns" for a value of a dimension of a component such as its thickness should be considered to include any and all subranges beginning with a minimum value of 1.0 microns or more and ending with a maximum value of 2.0 microns or less, e.g., 1.0 to 1.2, or 1.3 to 1.4, or 1.5 to 1.9 microns.

Briefly, and in general terms, the present disclosure provides a method of metallizing the surface of a structure comprising: providing a composite support structure; providing a release liner including a metallic layer having a thickness between 1 and 5 microns on a surface thereof; situating the release liner against the surface of the composite support structure so that the metallic layer of the release liner is in direct, physical contact with the surface of the support structure; and removing the release liner so that the metallic layer remains attached to the surface of the support structure.

In some embodiments, the difference in tensile strength between the composite support and the release liner is sufficiently great that allows the release liner to be peeled from the metallic layer which remains attached to the support structure.

In some embodiments, the composite support is composed of a carbon fiber composite material having a thickness of between 1 and 20 mil.

In some embodiments, the metallic layer is composed of aluminum.

In some embodiments, the metallic layer has a uniform thickness and covers the entire exterior surface of the support structure.

In some embodiments, the support structure with the metallic layer forms a mirror on a space vehicle.

In some embodiments, the removing step is performed manually.

In some embodiments, the composite support structure includes a non-uniform exterior surface with certain regions being concave and other regions being convex.

In some embodiments of the disclosure, the release liner is a polymide film layer such as KAPTON®. KAPTON® is a trademark of E.I. du Pont de Nemours and Company. The chemical name for KAPTON® is poly (4,4'-oxydiphenylene-pyromellitimide). Other polymide film sheets or layers such as MYLAR® (MYLAR® is a trademark of Dupont Teijin Films) may also be used.

In some embodiments, the release liner has a thickness of between 25 and 100 microns, or between 1 mil (25.4 μm) and 4 mil (101.6 μm).

In some embodiments, the substrate may be a rigid substrate, such as an aluminum honeycomb substrate with carbon composite face sheet.

In another aspect, the present disclosure provides a parabolic mirror and its method of fabrication comprising providing a support structure with a parabolic shape; providing a release liner including a metallic layer having a thickness between 1 and 5 microns on a surface thereof; situating the release liner against the surface of the support structure so that the metallic layer of the release liner is in direct, physical contact with the surface of the support structure; and removing the release liner so that the metallic layer remains attached to the surface of the support structure.

Some implementations of the present disclosure may incorporate or implement fewer of the aspects and features noted in the foregoing summaries.

Additional aspects, advantages, and novel features of the present disclosure will become apparent to those skilled in the art from this disclosure, including the following detailed description as well as by practice of the disclosure. While the disclosure is described below with reference to preferred embodiments, it should be understood that the disclosure is not limited thereto. Those of ordinary skill in the art having access to the teachings herein will recognize additional applications, modifications and embodiments in other fields, which are within the scope of the disclosure as disclosed and claimed herein and with respect to which the disclosure could be of utility.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DESCRIPTION OF ILLUSTRATIVE EMBODIMENTS

Figure 1:
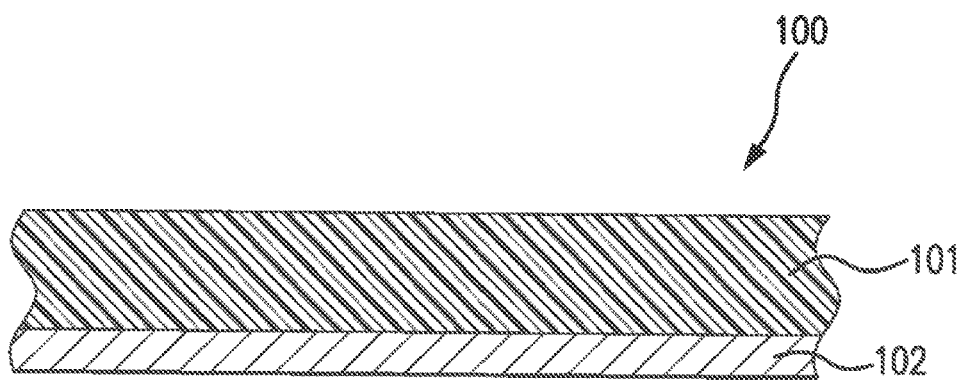
FIG. 1 is a cross-sectional view of a release liner according to the present disclosure.

Details of the present invention will now be described including exemplary aspects and embodiments thereof.

Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

FIG. 1 is a cross-sectional view of a release liner 100 according to the present disclosure. The bottom surface 102 of the liner 100 is composed of a metallic layer that is from one to five microns in thickness. The bulk of the release liner 100 is composed of a polyimide layer or film, in a thickness from 25 microns (or one mil) to several hundred microns. Such materials are commercially available, "off the shelf" items used for a variety of industrial application available from a variety of suppliers. The metallic layer may be composed of aluminum, silver, gold, or other metals, or combinations and layers thereof, depending upon the application.

Figure 2A:
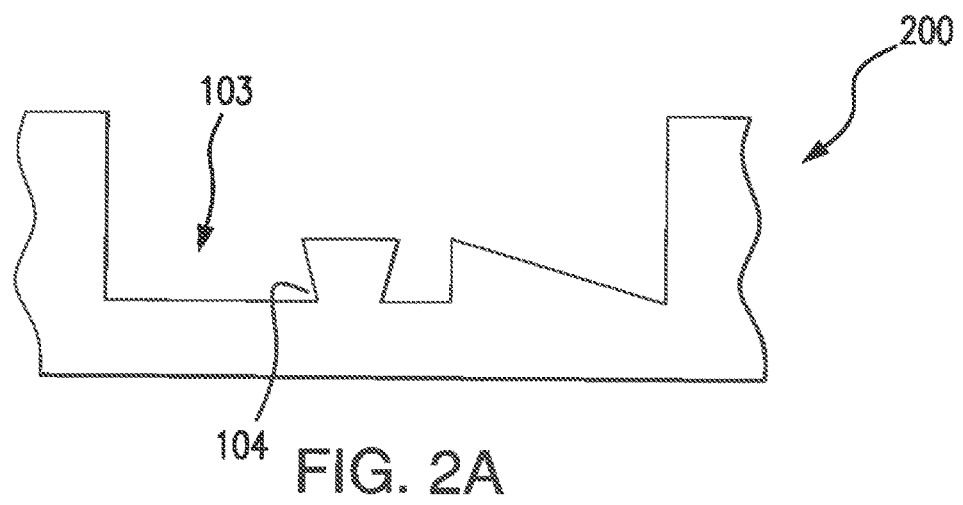
FIG. 2A is a cross-sectional view of a composite structure in one embodiment of the present disclosure.

FIG. 2A is a cross-sectional view of a composite structure 200 in one embodiment of the present disclosure. The structure 200 includes concave region 103 with corners 104. This figure illustrates the difficulty in achieving uniform thickness of a metallic layer using a prior art PVD technique. Because of the shape of the exposed surfaces of the structure, the coatings will not cover the concave regions 103 and corners 104 adequately.

Figure 2B:
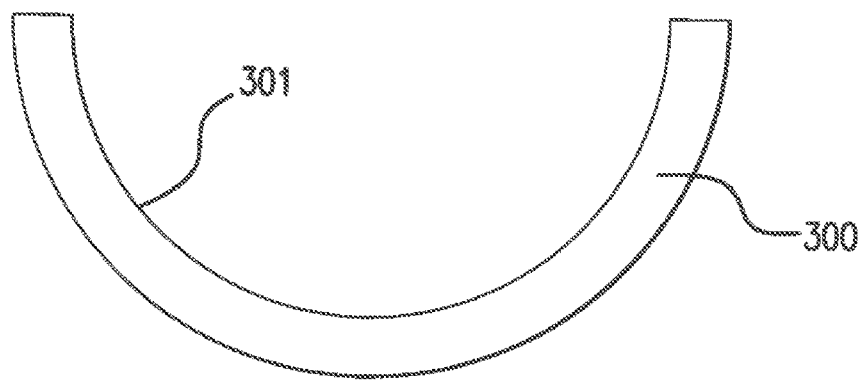
FIG. 2B is a cross-sectional view of a composite structure in a second embodiment of the present disclosure.

FIG. 2B is a cross-sectional view of a composite structure 300 in a second embodiment of the present disclosure, including a concave parabolic surface 301. In some embodiments, the structure may be a closed cell foam substrate. The thickness of the substrate may range from 1 inch to several inches or more.

Figure 3A:
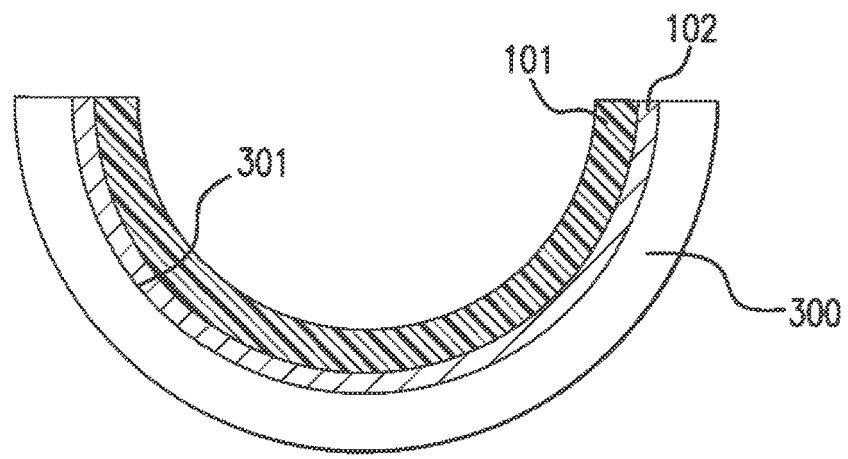
FIG. 3A is a cross-sectional view of the composite structure of FIG. 2B after the next process step of mounting the release liner.

FIG. 3A is a cross-sectional view of the composite structure 300 of FIG. 2B after the next process step of mounting the release liner 100 directly over the surface 301.

Figure 3B:
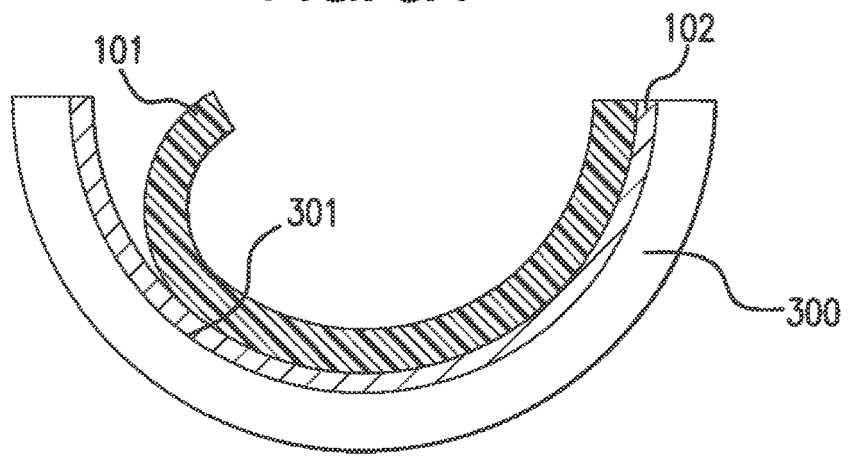
FIG. 3B is a cross-sectional view of the composite structure of FIG. 3A after the next step process step of peeling the supporting polyimide film away from the bottom metallic layer bonded to the surface of the composite structure.

FIG. 3B is a cross-sectional view of the composite structure 300 of FIG. 3A after the next process step of peeling the film 101 away from the bottom metallic layer 102 so that the layer 102 remains bonded to the surface 301.

Figure 4:
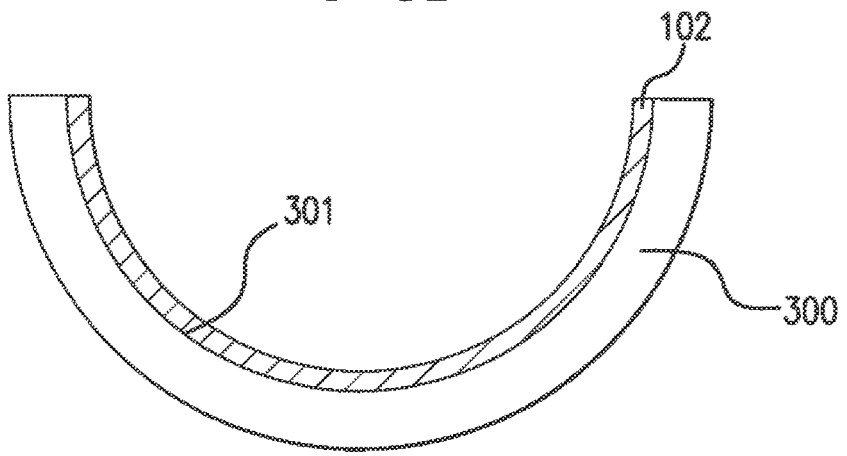
FIG. 4 is a cross-sectional view of the composite structure of FIG. 3B after the next process step after the polyimide film has been detached away from the bottom metallic layer which is bonded to the surface of the composite structure.

FIG. 4 is a cross-sectional view of the composite structure 300 of FIG. 3B after the next process step with the film 101 entirely peeled away from the bottom metallic layer 102, and the layer 102 remains bonded to the surface 301.

Figure 5:
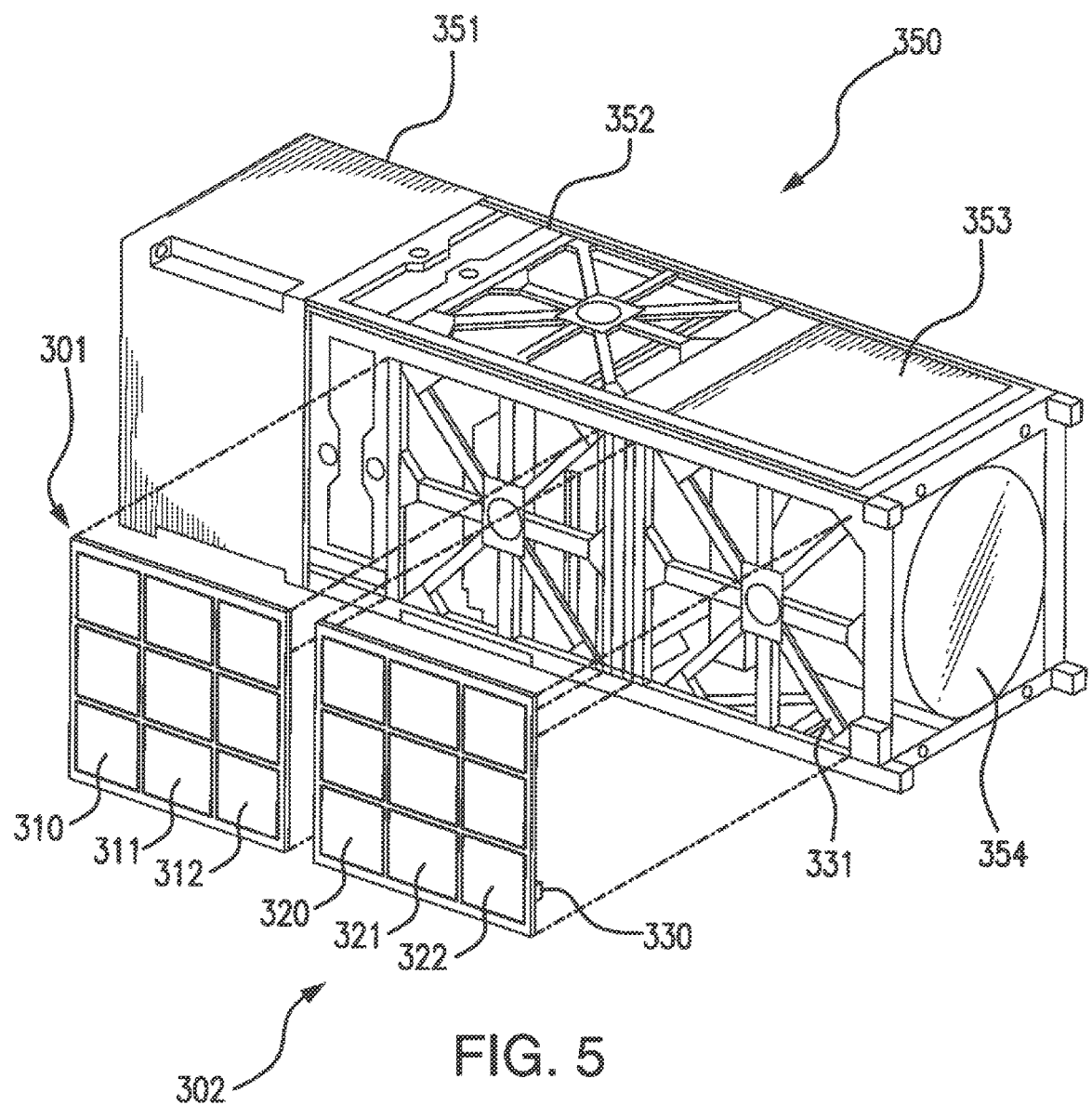
FIG. 5 is a perspective view of a space vehicle incorporating a mirror constructed according to the process of the present disclosure.

One application of the composite structure 300 is for use in a space vehicle, such as a CubeSat illustrated in FIG. 5. CubeSats are a type of miniaturized space vehicles or satellites. A typical CubeSat is a 10 cm×10 cm×10 cm cube, thus having a volume of one liter. CubeSats can be attached to one another in strings or blocks to provide functionalities and capabilities that would not otherwise be practically available in a single CubeSat. For example, one CubeSat can be used as a power source to supply power necessary for other attached CubeSats to perform their functions such as imaging, sensing, or communications.

The composite structures described herein can be particularly advantageous for attaching to a CubeSat. For example, the composite structures can be attached directly to the surface of the CubeSat without a need for a frame (e.g., an aluminum frame). Further, the solar cell modules can include a light weight flexible support (e.g., a polyimide support) or a non-flexible support (egg shell support).

A miniature satellite or CubeSat 350 can include the composite structure 354 according to the present disclosure. CubeSats 350 are a type of miniaturized satellites or nanosatellite. A typical CubeSat is a 10 cm×10 cm×10 cm cube, thus having a volume of one liter. CubeSats can be attached to one another in strings or blocks to provide functionalities and capabilities that would not otherwise be practically available in a single CubeSat. FIG. 5 for example illustrates three individual CubeSats 351, 352, 353 forming a 3-unit CubeSat 350.

Solar cell assemblies 310, 311, 312, 320, 321, 322 can be mounted on the sides of a CubeSat. For example, the solar cells or solar cell assemblies can be attached directly to the surface of a support 301, 302 which are then mounted via attachment clip 330 directly on the CubeSat component 331 without a need for a frame (e.g., an aluminum or honeycomb frame). Further, the solar cell supports 301, 302 can be composed of a light weight flexible support (e.g., a KAPTON or other polyimide support) or a rigid and non-flexible support. The polyimide sheets as either a continuous layer or a patterned layer designed for a particular application. The base or backplane of the unit is typically a space qualified or qualifiable material (e.g., KAPTON, polyester, polyimide, Aramid™, Pyralux™) that is lightweight, flexible, and reliable in space applications. Kapton™ is a poly (4,4'-oxydiphenylene-pyromellitimide) material.

A mirror constructed of the composite structure 300 may be used for directing electromagnetic energy (e.g., microwave, or light) into or away from an object.

The composite structure 300 serves to provide the shape or contour of the mirror. The contour can be spherical, aspherical, cylindrical, cylindrical aspheric, planar, or any other shape. The composite structure is of a material which provides thermomechanical stability, low mass, and stiffness. It can be made from metals, composite sandwich structures, plastic or in the preferred embodiment Graphite Fiber Reinforced Composite (GFRC). In one embodiment, the composite structure 300 is a six layer GFRC laminate composite in which the plies or layers are uni-directional plies, arranges in a sequential direction layup to provide quasi-isotropic properties and a balanced laminate, such as a (0/60/-60/-60/60/0) with each ply comprising a 0.04 mm layer of graphite fibers, such as Mitsubishi's K13D2U in a cyanate resin ester matrix, such as Tencatels RS3-C control flow cyanate resin. In one embodiment, the six ply GFRC substrate is cured on a shaped forming mandrel machined with high precision to provide the contour of the mirror. Other fibers can also be used. These include M55J graphite fiber from Toray Industries, Inc., or fiberglass, or NOMEX® (a registered trademark of E. I. du Pont de Nemours and Company Corporation) fibers, depending on the amount of stiffness and thermal stability required. Fiberglass or other common fibers may also be used for low cost terrestrial applications. Other fiber reinforcement forms, such as woven fabric or felt mats, and other resin matrices, including epoxies, polyimides or bismaleamide resins, or other thermoplastic resins as well as thermosetting plastic resins may also be used.

It is to be noted that the terms "front", "back", "top", "bottom", "over", "on", "under", and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The present disclosure can be embodied in various ways. The above described orders of the steps for the methods are only intended to be illustrative, and the steps of the methods of the present disclosure are not limited to the above specifically described orders unless otherwise specifically stated. Note that the embodiments of the present disclosure can be freely combined with each other without departing from the spirit and scope of the disclosure.

Although some specific embodiments of the present disclosure have been demonstrated in detail with examples, it should be understood by a person skilled in the art that the above examples are only intended to be illustrative but not to limit the scope of the present disclosure. It should be understood that the above embodiments can be modified without departing from the scope and spirit of the present disclosure which are to be defined by the attached claims.

The invention claimed is:

1. A method of metallizing the surface of a structure to form a mirror for use on a space vehicle, the method comprising:
   providing a composite support structure having a surface, wherein the composite support structure comprises a fiber selected from the group of consisting of: carbon fiber, glass fiber, polyamide fiber, stainless steel fiber, copper fiber, boron fiber, and amorphous metal fiber;
   providing a release liner comprising a polymer sheet and a metallic layer having a thickness between 1 and 5 microns on a surface of the polymer sheet;
   situating the release liner against the surface of the composite support structure so that the metallic layer is in direct, physical contact with the surface of the composite support structure; and
   removing the polymer sheet so that the metallic layer remains as a reflective metal film attached to the surface of the composite support structure.

2. A method as defined in claim 1, wherein the difference in tensile strength between the composite support structure and the release liner is sufficiently great that allows the release liner to be peeled from the metallic layer which remains attached to the support structure.

3. A method as defined in claim 1, wherein the composite support structure is composed of a carbon fiber composite material having a thickness of between 1 and 20 mil.

4. A method as defined in claim 1, wherein the release liner is composed of a poly (4, 4'-oxydiphenylene-pyromellitimide) material.

5. A method as defined in claim 1, wherein the metallic layer comprises aluminum.

6. A method as defined in claim 1, wherein the metallic layer has a uniform thickness and covers the entire exterior surface of the composite support structure.

7. A method as defined in claim 1, wherein the composite support structure with the metallic layer forms a mirror adapted for implementation on a space vehicle.

8. A method as defined in claim 1, wherein the removing step is performed manually.

9. A method as defined in claim 1, wherein the composite support structure includes a non-uniform exterior surface with certain regions being concave and other regions being convex.

10. A method as defined in claim 1, wherein the release liner has a thickness of between 25 and 100 microns, or between 1 mil (25.4 µm) and 4 mil (101.6 µm).

11. A method as defined in claim 8, wherein the mirror is parabolic in shape.

12. A method as defined in claim 1, wherein the composite support structure includes a plurality of layers with each layer between 0.001 and 0.20 inches in thickness.

* * * * *